(12) United States Patent
Fujii et al.

(10) Patent No.: US 8,251,194 B2
(45) Date of Patent: Aug. 28, 2012

(54) SOLENOID VALVE

(75) Inventors: Noriomi Fujii, Anjo (JP); Kazuhiko Kato, Anjo (JP); Tetsuya Shimizu, Anjo (JP); Kazunori Ishikawa, Toyota (JP); Naoyuki Fukaya, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 492 days.

(21) Appl. No.: 12/591,600

(22) Filed: Nov. 24, 2009

(65) Prior Publication Data

US 2010/0163360 A1 Jul. 1, 2010

(30) Foreign Application Priority Data

Dec. 25, 2008 (JP) ................................. 2008-330068

(51) Int. Cl.
 *F16K 31/06* (2006.01)
 *F16H 61/00* (2006.01)
 *F16H 59/74* (2006.01)
 *F16D 25/10* (2006.01)
(52) U.S. Cl. ............... 192/3.58; 192/85.63; 251/129.15; 475/31; 477/77
(58) Field of Classification Search .................... 475/31; 477/83
 See application file for complete search history.

(56) References Cited

U.S. PATENT DOCUMENTS

2009/0301588 A1 12/2009 Shimizu et al.
2010/0028168 A1* 2/2010 Shimizu et al. ............... 417/213

FOREIGN PATENT DOCUMENTS

| JP | U 57-150280 | 9/1982 |
|---|---|---|
| JP | Y2 61-14635 | 5/1986 |
| JP | A 2000-009027 | 1/2000 |
| JP | A 2000-213734 | 8/2000 |
| JP | A 2000-249330 | 9/2000 |
| JP | A 2002-168330 | 6/2002 |
| JP | A 2003-262330 | 9/2003 |
| JP | A 2007-126974 | 5/2007 |
| JP | A-2007-282433 | 10/2007 |
| WO | WO 2009/145176 A1 | 12/2009 |

OTHER PUBLICATIONS

International Search Report mailed Feb. 16, 2010 for PCT/JP2009/069217.

* cited by examiner

*Primary Examiner* — Rodney Bonck
(74) *Attorney, Agent, or Firm* — Oliff & Berridge, PLC

(57) ABSTRACT

A solenoid valve device that includes a solenoid valve; a drive circuit that drives the solenoid section; a current sensor that detects a current applied to the solenoid section; and a control unit that controls, when the solenoid valve is served as the pressure control valve, the drive circuit by performing a feedback control based on the current detected by the current sensor so that a current in accordance with an output pressure command is applied to the solenoid section, and controls, when the solenoid valve is served as the solenoid pump, the drive circuit without performing the feedback control so that a pump current is applied to the solenoid section.

6 Claims, 7 Drawing Sheets

|   |     | C1 | C2 | C3 | B1 | B2 | B3 | B4 | F1 | F2 | F3 |
|---|-----|----|----|----|----|----|----|----|----|----|----|
|   | P   |    |    |    |    |    |    |    |    |    |    |
|   | R   |    |    | O  | (O)|    |    | O  | O  |    |    |
|   | N   |    |    |    |    |    |    |    |    |    |    |
| D | 1st | O  |    |    |    |    |    | (O)|    |    | O  |
|   | 2nd | O  |    |    |    | (O)| O  |    | O  | O  |    |
|   | 3rd | O  |    | O  | (O)|    | ●  |    | O  |    |    |
|   | 4th | O  | O  | ●  |    |    | ●  |    |    |    |    |
|   | 5th |    | O  | O  | O  |    | ●  |    |    |    |    |

(O) : ENGINE BRAKE IN OPERATION
● : ENGAGED BUT NO TORQUE TRANSMITTED

SOLENOID VALVE

CROSS-REFERENCE TO RELATED APPLICATION

The disclosure of Japanese Patent Application No. 2008-330068 filed on Dec. 25, 2008 including the specification, drawings and abstract is incorporated herein by reference in its entirety.

BACKGROUND

The present invention relates to a solenoid valve device and a power transmission device.

Conventionally, as this type of solenoid valve device, one that drives a linear solenoid using a current in accordance with a target value of control current has been proposed (refer to Japanese Patent Application Publication No. JP-A-2007-282433, for instance). This device is provided with a current monitor that detects a current flowing through the solenoid, generates a PWM signal through a feedback control based on the target value of control current and an output value from the current monitor, and performs a switching of solenoid driving transistors that drive the linear solenoid based on the generated PWM signal.

SUMMARY

Incidentally, as an apparatus that operates using an electromagnetic force of a solenoid, there can be cited a solenoid pump that pressure-feeds a hydraulic oil by reciprocating a plunger using the electromagnetic force and an urging force of a spring, and the like, in addition to the aforementioned linear solenoid. When a hydraulic circuit is structured by incorporating such an apparatus therein, it is generally designed such that a required electromagnetic force can be obtained in accordance with a characteristic required for each of the incorporated apparatus. Accordingly, a space corresponding to the number of the incorporated linear solenoids or the solenoid pumps is required, resulting in that a size of the entire circuit is enlarged. In particular, when the hydraulic circuit is mounted on a vehicle, since a space in the vehicle is limited, a downsizing of a device while making the device exhibit a required performance can be considered as an important task.

A solenoid valve device and a power transmission device of the present invention have a main object to realize a downsizing of the entire devices while making the devices exhibit their performances.

In order to achieve the aforementioned main object, the solenoid valve device and the power transmission device of the present invention adopt units described hereinbelow.

It is a gist that a solenoid valve device of the present invention includes: a solenoid valve having a hollow sleeve in which a first port group including an input port, an output port, and a drain port, and a second port group including a suction port and a discharge port are formed, a spool which is a shaft member to be inserted into the sleeve and capable of opening/closing the respective ports by sliding in an axial direction, a spring that urges the spool in the axial direction, and a solenoid section that generates a thrust with respect to the spool in a direction opposite to the spring, the solenoid valve being formed with a pressure control chamber formed between the sleeve and the spool to serve as a pressure control valve that adjusts the thrust generated in the solenoid section to control a pressure of a hydraulic fluid input into the input port through a discharge of the fluid from the drain port and outputs the fluid from the output port, and a pump chamber formed by being divided as a space isolated from the pressure control chamber between the sleeve and the spool to serve as a solenoid pump that sucks the hydraulic fluid via the suction port and discharges the fluid from the discharge port by repeatedly making the solenoid section generate the thrust and stop the generation thereof; a drive circuit that drives the solenoid section; a current sensor that detects a current applied to the solenoid section; and a control unit that controls, when the solenoid valve is served as the pressure control valve, the drive circuit by performing a feedback control based on the current detected by the current sensor so that a current in accordance with an output pressure command is applied to the solenoid section, and controls, when the solenoid valve is served as the solenoid pump, the drive circuit without performing the feedback control so that a pump current is applied to the solenoid section.

In the solenoid valve device of the present invention, the solenoid valve is structured by providing the pressure control chamber formed between the sleeve and the spool to serve as the pressure control valve that adjusts the thrust generated in the solenoid section to control the pressure of the hydraulic fluid input into the input port through the discharge of the fluid from the drain port and outputs the fluid from the output port, and the pump chamber formed by being divided as a space isolated from the pressure control chamber between the sleeve and the spool to serve as the solenoid pump that sucks the hydraulic fluid via the suction port and discharges the fluid from the discharge port by repeatedly making the solenoid section generate the thrust and stop the generation thereof. In the solenoid valve device of the present invention, when the solenoid valve is served as the pressure control valve, the drive circuit is controlled by performing the feedback control based on the current detected by the current sensor so that the current in accordance with the output pressure command is applied to the solenoid section, and when the solenoid valve is served as the solenoid pump, the drive circuit is controlled without performing the feedback control so that the pump current is applied to the solenoid section. Accordingly, it is possible to form the pressure control valve and the solenoid pump in an integral manner to downsize the entire device while realizing both the performance as the pressure control valve and the performance as the solenoid pump.

In such a solenoid valve device of the present invention, the drive circuit is a circuit that adjusts a power supply voltage and applies the voltage to a coil of the solenoid section by performing a switching of a switching element, and the control unit can also be a unit of controlling, when the solenoid valve is served as the pressure control valve, the drive circuit by setting a target voltage based on a deviation between a current command in accordance with the output pressure command and the current detected by the current sensor, and controlling, when the solenoid valve is served as the solenoid pump, the drive circuit by directly setting a rectangular-wave command voltage. With this configuration, the solenoid valve can be driven with a simple control.

It is a gist that a power transmission device of the present invention is a power transmission device in which an input shaft and an output shaft are connected to an output shaft of a motor and an axle side of a vehicle, respectively, and which transmits a power input into the input shaft to the output shaft by switching an engagement state of a clutch, and the power transmission device includes either of the solenoid valve devices of the aforementioned respective aspects of the present invention incorporated in a fluid pressure circuit that operates the clutch with a fluid pressure, which is, basically, a solenoid valve device that includes: a solenoid valve having a hollow sleeve in which a first port group including an input port, an output port, and a drain port, and a second port group including a suction port and a discharge port are formed, a spool which is a shaft member to be inserted into the sleeve and capable of opening/closing the respective ports by sliding in an axial direction, a spring that urges the spool in the axial direction, and a solenoid section that generates a thrust with respect to the spool in a direction opposite to the spring, the solenoid valve being formed with a pressure control chamber formed between the sleeve and the spool to serve as a pressure control valve that adjusts the thrust generated in the solenoid section to control a pressure of a hydraulic fluid input into the input port through a discharge of the fluid from the drain port and outputs the fluid from the output port, and a pump chamber formed by being divided as a space isolated from the pressure control chamber between the sleeve and the spool to serve as a solenoid pump that sucks the hydraulic fluid via the suction port and discharges the fluid from the discharge port by repeatedly making the solenoid section generate the thrust and stop the generation thereof; a drive circuit that drives the solenoid section; a current sensor that detects a current applied to the solenoid section; and a control unit that controls, when the solenoid valve is served as the pressure control valve, the drive circuit by performing a feedback control based on the current detected by the current sensor so that a current in accordance with an output pressure command is applied to the solenoid section, and controls, when the solenoid valve is served as the solenoid pump, the drive circuit without performing the feedback control so that a pump current is applied to the solenoid section.

In the power transmission device of the present invention, either of the solenoid valve devices of the aforementioned respective aspects of the present invention is included, so that the same effect as that of the solenoid valve device of the present invention such as, for instance, an effect of realizing a downsizing of the entire device by forming the pressure control valve and the solenoid pump in an integral manner, while realizing both the performance as the pressure control valve and the performance as the solenoid pump, can be achieved. As a result of this, it is possible to realize a downsizing of the entire fluid pressure circuit while making the circuit exhibit its performance. Here, the "motor" includes not only an internal combustion engine capable of executing automatic stop and automatic start, but also an electric motor.

It is also possible that such a power transmission device of the present invention includes an automatic transmission capable of transmitting a power from the motor to the axle side by switching an engagement state of a plurality of clutches to change a transmission ratio, and a mechanical pump that is driven by the power from the motor to generate the fluid pressure, in which the solenoid valve device is structured to input the fluid pressure from the mechanical pump side via the input port and supply the fluid pressure to the clutch side via the output port while controlling the pressure when the solenoid valve is served as the pressure control valve, and to suck the hydraulic fluid via the suction port as well as generate the fluid pressure and supply the fluid pressure to the clutch via the discharge port when the solenoid valve is served as the solenoid pump. The power transmission device of this aspect of the present invention can also include a control unit that controls the solenoid section to make the fluid pressure act on a clutch that forms a transmission ratio for starting among the plurality of clutches by making the solenoid valve serve as the solenoid pump when the motor is stopped in accordance with the stop of the vehicle. With this configuration, the gear ratio for starting can be formed promptly when the power starts to be output from the motor, resulting in that the starting can be carried out smoothly.

DETAILED DESCRIPTION OF EMBODIMENTS

Next, best modes for carrying out the present invention will be described using an embodiment.

Figure 1:
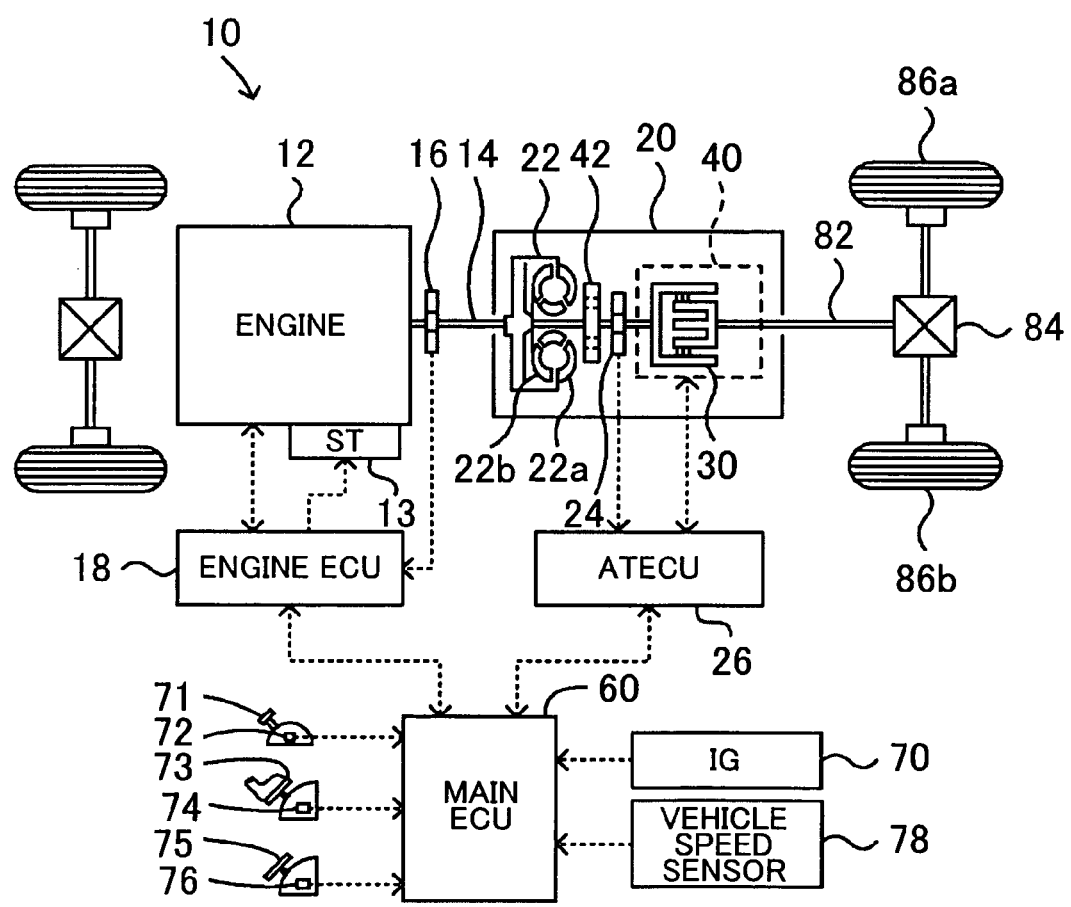
FIG. 1 is a structural diagram showing an outline of a structure of an automobile 10 in which a power transmission device 20 as an embodiment of the present invention is incorporated.
Figures 2, 3:
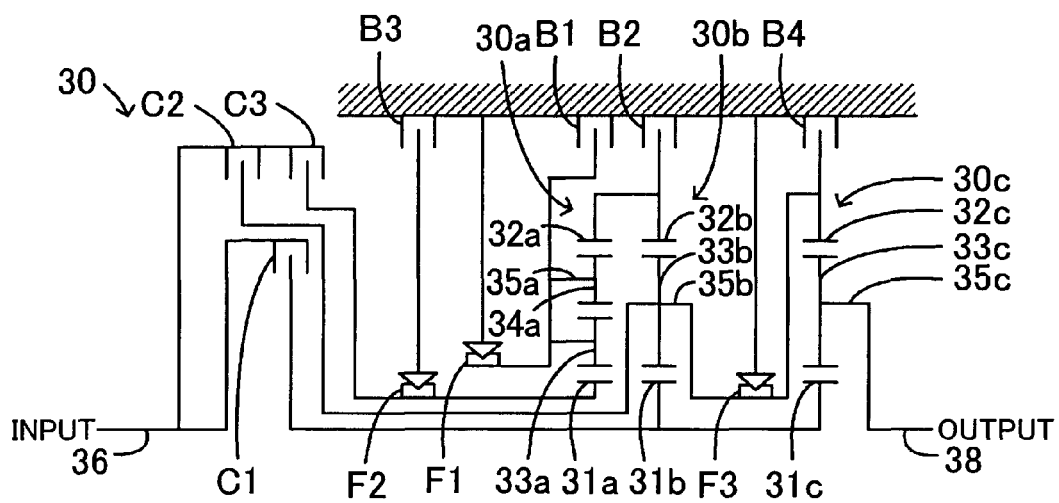
FIG. 2 is a structural diagram showing an outline of a structure of an automatic transmission 30 included in the power transmission device 20 of the embodiment.
FIG. 3 is an explanatory diagram showing an operation table of the automatic transmission 30.

FIG. 1 is a structural diagram showing an outline of a structure of an automobile 10 in which a power transmission device 20 as an embodiment of the present invention is incorporated, FIG. 2 is a structural diagram showing an outline of a structure of an automatic transmission 30 included in the power transmission device 20 of the embodiment, and FIG. 3 is an explanatory diagram showing an operation table of the automatic transmission 30.

As shown in FIG. 1, the automobile 10 of the embodiment includes an engine 12 as an internal combustion engine that outputs power through explosive combustion of a hydrocarbon-based fuel such as gasoline and light oil, and the power transmission device 20 of the embodiment connected to a crankshaft 14 of the engine 12 and connected to a drive shaft 82 coupled to left and right wheels 86a, 86b via a differential gear 84, and transmitting the power from the engine 12 to the drive shaft 82.

An operation of the engine 12 is controlled by an engine electronic control unit (hereinafter, referred to as engine ECU) 18. Although not illustrated in detail, the engine ECU 18 is formed as a microprocessor having a CPU as a central component, and includes, in addition to the CPU, a ROM that stores a processing program, a RAM that temporarily stores data, input/output ports, and communication ports. In the engine ECU 18, signals from various sensors necessary for controlling the operation of the engine 12 such as a rotation speed sensor 16 attached to the crankshaft 14 are input via the input ports, and from the engine ECU 18, a driving signal to a throttle motor that adjusts a throttle opening degree, a control signal to a fuel injection valve, an ignition signal to an ignition plug, a driving signal to a starter motor 13 that cranks the engine 12, and the like are output via the output ports. The engine ECU 18 communicates with a main electronic control unit (hereinafter, referred to as main ECU) 60 that controls the entire vehicle, and it controls the engine 12 in accordance with a control signal from the main ECU 60, and outputs data regarding an operational status of the engine 12 to the main ECU 60 according to need.

The power transmission device 20 of the embodiment is structured as a transaxle device that transmits the power from the engine 12 to the drive shaft 82, and includes a torque converter 22 with lock-up clutch formed of an input-side pump impeller 22a and an output-side turbine runner 22b connected to the crankshaft 14 of the engine 12, a mechanical oil pump 42 disposed on a subsequent stage of the torque converter 22 and pressure-feeding a hydraulic oil using the power from the engine 12, a stepped automatic transmission 30 being a hydraulic-driven transmission having an input shaft 36 connected to the turbine runner 22b side of the torque converter 22 and an output shaft 38 connected to the drive shaft 82, and changing the speed of the power input into the input shaft 36 to output the power to the output shaft 38, a hydraulic circuit 40 as an actuator that drives the automatic transmission 30, an automatic transmission electronic control unit (hereinafter, referred to as ATECU) 26 that controls the automatic transmission 30 (hydraulic circuit 40), and the main ECU 60.

As shown in FIG. 2, the automatic transmission 30 includes a double-pinion type planetary gear mechanism 30a, two single-pinion type planetary gear mechanisms 30b, 30c, three clutches C1, C2, C3, four brakes B1, B2, B3, B4, and three one-way clutches F1, F2, F3. The double-pinion type planetary gear mechanism 30a includes a sun gear 31a as an external gear, a ring gear 32a as an internal gear disposed to be concentric with the sun gear 31a, a plurality of first pinion gears 33a meshing with the sun gear 31a, a plurality of second pinion gears 34a meshing with the first pinion gears 33a as well as meshing with the ring gear 32a, and a carrier 35a coupling the plurality of first pinion gears 33a and the plurality of second pinion gears 34a and holding the gears in a rotatable and revolvable manner. It is designed such that the sun gear 31a is connected to the input shaft 36 via the clutch C3 and can be controlled to rotate freely or in one direction when the brake B3 connected via the one-way clutch F2 is turned on or off, a rotation of the ring gear 32a can be freely performed or fixed when the brake B2 is turned on or off, and the carrier 35a is controlled to rotate in one direction by the one-way clutch F1 and a rotation thereof can be freely performed or fixed when the brake B1 is turned on or off. The single-pinion type planetary gear mechanism 30b includes a sun gear 31b being an external gear, a ring gear 32b being an internal gear disposed to be concentric with the sun gear 31b, a plurality of pinion gears 33b meshing with the sun gear 31b as well as meshing with the ring gear 32b, and a carrier 35b holding the plurality of pinion gears 33b in a rotatable and revolvable manner. It is designed such that the sun gear 31b is connected to the input shaft 36 via the clutch C1, the ring gear 32b is connected to the ring gear 32a of the double-pinion type planetary gear mechanism 30a and a rotation thereof can be freely performed or fixed when the brake B2 is turned on or off, and the carrier 35b is connected to the input shaft 36 via the clutch C2 and can be controlled to rotate in one direction by the one-way clutch F3. Further, the single-pinion type planetary gear mechanism 30c includes a sun gear 31c being an external gear, a ring gear 32c being an internal gear disposed to be concentric with the sun gear 31c, a plurality of pinion gears 33c meshing with the sun gear 31c as well as meshing with the ring gear 32c, and a carrier 35c holding the plurality of pinion gears 33c in a rotatable and revolvable manner. It is designed such that the sun gear 31c is connected to the sun gear 31b of the single-pinion type planetary gear mechanism 30b, the ring gear 32c is connected to the carrier 35b of the single-pinion type planetary gear mechanism 30b and a rotation thereof can be freely performed or fixed when the brake B4 is turned on or off, and the carrier 35c is connected to the output shaft 38.

As shown in FIG. 3, the automatic transmission 30 is designed to be able to switch first to fifth forward speeds, reverse speed and neutral speed, when the clutches C1 to C3 are turned on/off and the brakes B1 to B4 are turned on/off. The first forward speed, namely, the state in which the rotation of the input shaft 36 is reduced at the largest speed reduction ratio and transmitted to the output shaft 38, can be established by turning on the clutch C1 as well as turning off the clutches C2, C3, and the brakes B1 to B4. In the first forward speed, when an engine brake is in operation, the rotation of the ring gear 32c is fixed not by the one-way clutch F3 but the brake B4 when it is turned on. The second forward speed can be established by turning on the clutch C1 and the brake B3 as well as turning off the clutches C2, C3, and the brakes B1, B2, B4. In the second forward speed, when the engine brake is in operation, the rotations of the ring gear 32a and the ring gear 32b are fixed not by the one-way clutch F1 and the one-way clutch F2 but the brake B2 when it is turned on. The third forward speed can be established by turning on the clutches C1, C3, and the brake B3 as well as turning off the clutch C2, and the brakes B1, B2, B4. The fourth forward speed can be established by turning on the clutches C1 to C3 and the brake B3 as well as turning off the brakes B1, B2, B4. The fifth forward speed, namely, the state in which the rotation of the input shaft 36 is reduced (increased) at the smallest speed reduction ratio and transmitted to the output shaft 38, can be established by turning on the clutches C2, C3, and the brakes B1, B3 as well as turning off the clutch C1, and the brakes B2, B4. Further, in the automatic transmission 30, the state of neutral, namely, the cutting-off of a connection between the input shaft 36 and the output shaft 38 can be realized by turning off all the clutches C1 to C3 and the brakes B1 to B4. Further, the reverse speed can be established by turning on the clutch C3 and the brake B4 as well as turning off the clutches C1, C2, and the brakes B1 to B3.

Figure 4:
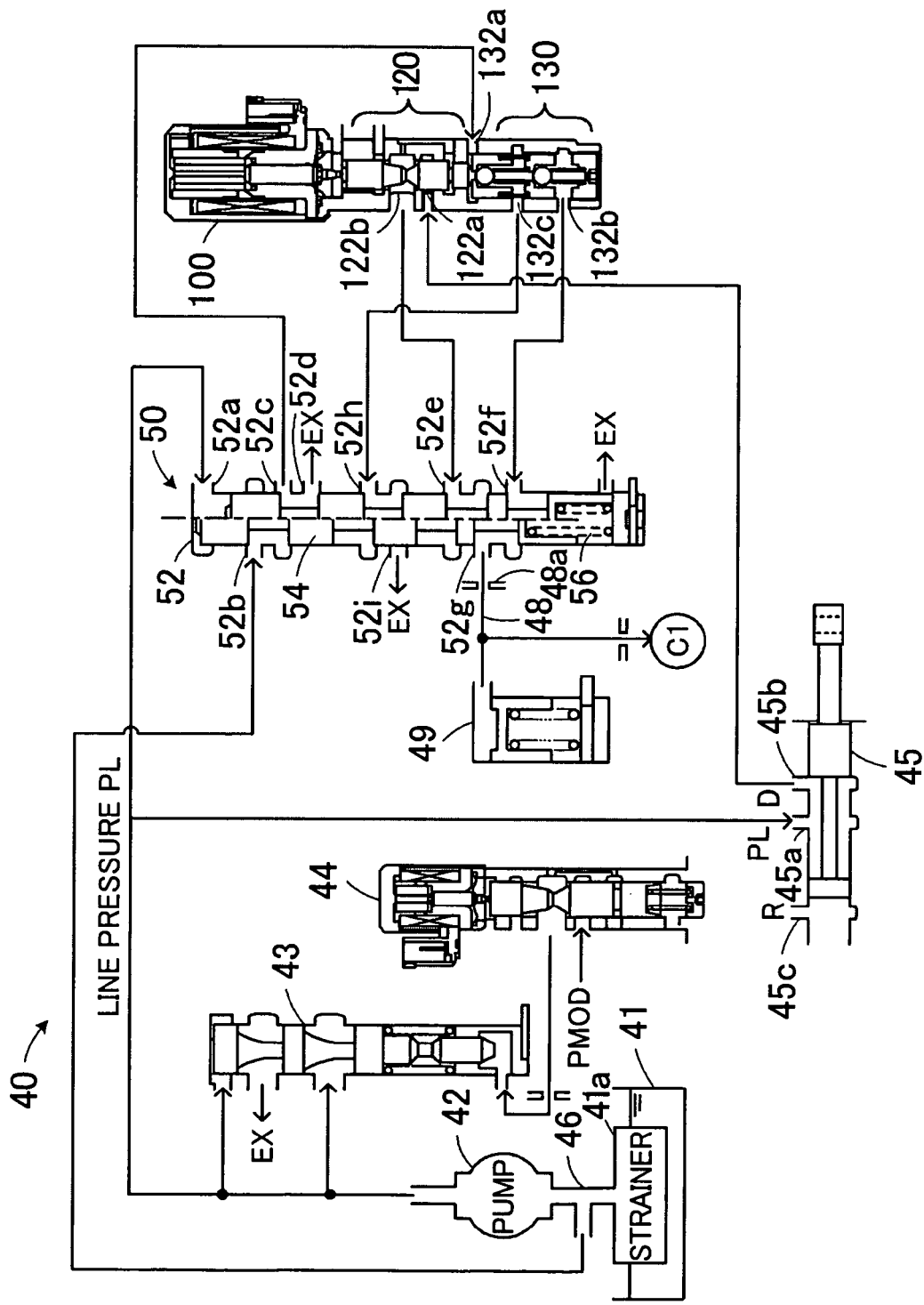
FIG. 4 is partial structural diagram showing an outline of a structure of a driving system of a clutch C1 in a hydraulic circuit 40.

The turning on/off of the clutches C1 to C3 and the turning on/off of the brakes B1 to B4 in the automatic transmission 30 are performed by the hydraulic circuit 40. FIG. 4 is a partial structural diagram showing an outline of a structure of a driving system of the clutch C1 in the hydraulic circuit 40. As shown in FIG. 4, the hydraulic circuit 40 includes an oil pan 41 that stores the hydraulic oil, a strainer 41a that filters the hydraulic oil stored in the oil pan 41, a regulator valve 43 that adjusts a pressure (line pressure PL) of the hydraulic oil pressure-fed from the oil pan 41 via the strainer 41a by the mechanical oil pump 42 using the power from the engine 12, a linear solenoid 44 that controls a modulator pressure PMOD generated from the line pressure PL via a not-shown modulator valve and outputs the pressure as a signal pressure to drive the regulator valve 43, a manual valve 45 in which an input port 45a through which the line pressure PL is input, an output port for D (drive) position 45b, an output port for R (reverse) position 45c, and the like are formed, and allowing communication and disconnection among each of the ports in conjunction with an operation of a shift lever 71, a solenoid valve 100 served as a linear solenoid that inputs the hydraulic oil from the output port for D position 45b of the manual valve 45, and outputs it to the clutch C1 side after controlling the pressure of the oil, and also served as a solenoid pump that pressure-feeds the hydraulic oil to the clutch C1, a switching valve 50 that selectively inputs the hydraulic oil from the solenoid valve 100 served as the linear solenoid and the hydraulic oil from the solenoid valve 100 served as the solenoid pump, and outputs the oil to the clutch C1, an accumulator 49 connected to an oil passage between the clutch C1 and the switching valve 50, served as a damper that suppresses a sudden change in the hydraulic pressure acting on the clutch C1, and accumulating the hydraulic pressure acting on the clutch C1, and the like. In an oil passage 48 connecting the switching valve 50 and the accumulator 49, an orifice 48a is provided. Note that in FIG. 4, hydraulic systems such as the other clutches C2, C3 other than the clutch C1, and the brakes B1 to B4 are omitted since they do not serve as a core of the present invention, but, these hydraulic systems can be formed by using well-known linear solenoids and the like. Hereinafter, details of the solenoid valve 100 included in the hydraulic circuit 40 will be further described.

Figure 5:
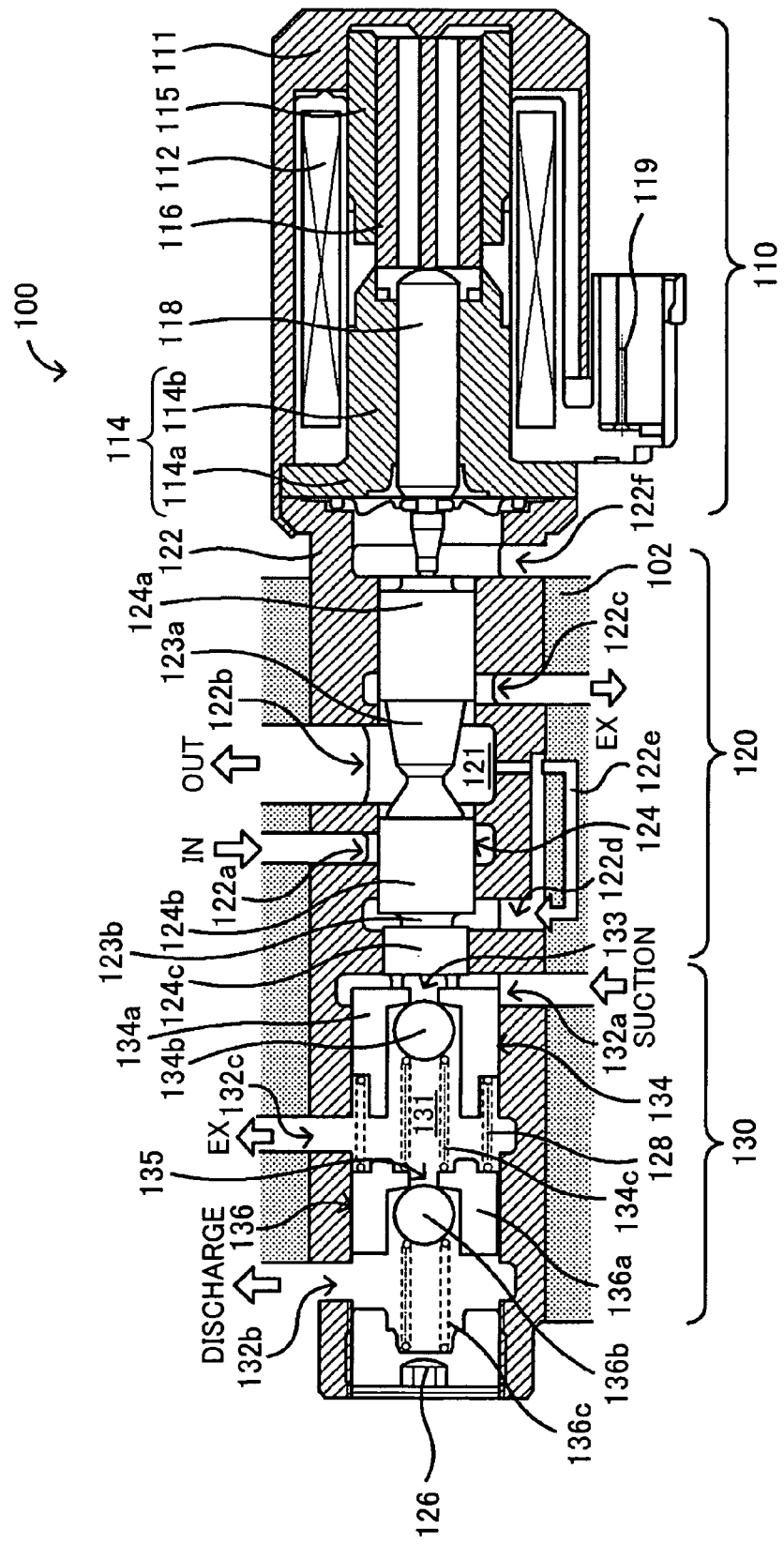
FIG. 5 is a structural diagram showing an outline of a structure of a solenoid valve 100.

FIG. 5 is a structural diagram showing an outline of a structure of the solenoid valve 100. The solenoid valve 100 is structured to serve not only as a linear solenoid valve for direct control capable of directly controlling the clutch C1 by generating an optimum clutch pressure from the line pressure PL input via the manual valve 45, but also as a solenoid pump that generates the hydraulic pressure, and includes a solenoid section 110, a pressure control valve section 120 that is driven by the solenoid section 110 to input the line pressure PL, and outputs the input line pressure PL after controlling the pressure, and a pump section 130 that is similarly driven by the solenoid section 110 to pressure-feed the hydraulic oil.

The solenoid section 110 includes a case 111 as a bottomed cylindrical member, a coil (solenoid coil) 112 disposed on an inner peripheral side of the case 111 and formed of an insulating bobbin around which an insulated electrical conductor is wound, a first core 114 which is formed of a flange portion 114a formed by fixing a flange outer peripheral portion to an open end portion of the case 111, and a cylinder portion 114b extended in an axial direction along an inner peripheral surface of the coil 112 from the flange portion 114a, a cylindrical second core 115 which is in contact with an inner peripheral surface of a recessed portion formed on a bottom portion of the case 111 and extended in the axial direction to a position spaced a predetermined interval from the cylinder portion 114b of the first core 114, along the inner peripheral surface of the coil 112, a plunger 116 which is inserted into the second core 115 and is slidable in the axial direction on an inner peripheral surface of the first core 114 and an inner peripheral surface of the second core 115, and a shaft 118 which is inserted into the cylinder portion 114b of the first core 114, abuts against a tip of the plunger 116, and is slidable in the axial direction on an inner peripheral surface of the cylinder portion 114b. Further, in the solenoid section 110, a terminal from the coil 112 is arranged in a connector portion 119 formed on an outer peripheral portion of the case 111, and through this terminal, the power is distributed to the coil 112. Each of the case 111, the first core 114, the second core 115, and the plunger 116 is formed of a ferromagnetic material such as iron with high purity, and a space between an end face of the cylinder portion 114b of the first core 114 and an end face of the second core 115 is formed so as to serve as a nonmagnetic body. Note that since the space is only required to serve as the nonmagnetic body, it is also possible that a nonmagnetic metal such as stainless steel and brass is disposed. In the solenoid section 110, when the power is distributed to the coil 112, a magnetic circuit in which a magnetic flux flows around the coil 112 in the order of the case 111, the second core 115, the plunger 116, the first core 114, and the case 111 is formed. Accordingly, an attraction force acts between the first core 114 and the plunger 116, and the plunger 116 is attracted. As described above, since the shaft 118 which is slidable in the axial direction on the inner peripheral surface of the first core 114 is abutted against the tip of the plunger 116, the shaft 118 is pushed out forward (leftward in the drawing) in accordance with the attraction of the plunger 116.

The pressure control valve section 120 and the pump section 130 include, as their common members, a substantially cylindrical sleeve 122 built in a valve body 102 and whose one end is attached to the first core 114 via the case 111 of the solenoid section 110, a spool 124 which is inserted into an internal space of the sleeve 122 and whose one end is abutted against a tip of the shaft 118 of the solenoid section 110, an end plate 126 which is screwed to the other end of the sleeve 122, and a spring 128 that urges the spool 124 toward the solenoid section 110 side.

As openings of a region that forms the pressure control valve section 120, the sleeve 122 is formed with an input port 122a through which the hydraulic oil from the output port for D position 45b of the manual valve 45 is input, an output port 122b from which the input hydraulic oil is discharged to the clutch C1 side, a drain port 122c from which the input hydraulic oil is drained, and a feedback port 122d into which the hydraulic oil output from the output port 122b is input via an oil passage 122e formed by an inner surface of the valve body 102 and an outer surface of the sleeve 122 to make a feedback force act on the spool 124. Further, a discharge aperture 122f for discharging the hydraulic oil leaked out from between an inner peripheral surface of the sleeve 122 and an outer peripheral surface of the spool 124 due to the slide of the spool 124 is also formed on an end portion of the solenoid section 110 side of the sleeve 122. Further, as openings of a region that forms the pump section 130, the sleeve 122 is formed with a suction port 132a through which the hydraulic oil is sucked, a discharge port 132b from which the sucked hydraulic oil is discharged, and a drain port 132c from which the hydraulic oil remained when the function of the pump section 130 is stopped is drained.

The spool 124 is formed as a shaft member which is inserted inside the sleeve 122, and includes three cylindrical lands 124a, 124b, 124c capable of sliding on an inner wall of the sleeve 122, a communication portion 123a that couples between the land 124a and the land 124b, is formed in a tapered shape having an outside diameter that is smaller than outside diameters of the lands 124a, 124b and that becomes smaller toward a center portion thereof from the respective lands 124a, 124b, and is capable of communicating among the respective ports of the input port 122a, the output port 122b, and the drain port 122c, a coupling portion 123b that couples between the land 124b and the land 124c having an outside diameter smaller than that of the land 124b, and forms a feedback chamber together with the inner wall of the sleeve 122 for making the feedback force act on the spool 124 toward the solenoid section 110 side, a suction check valve 134 connected to the land 124c, and a discharge check valve 136 interposed between the suction check valve 134 and the end plate 126. The sleeve 122, the communication portion 123a and the lands 124a, 124b of the spool 124 form a pressure control chamber 121, and the sleeve 122, the suction check valve 134 and the discharge check valve 136 of the spool 124 form a pump chamber 131.

The suction check valve 134 of the pump section 130 includes a cylindrical main body 134a coupled to the land 124c and having an opening 133 formed on a center thereof that communicates between the pump chamber 131 and the suction port 132a, a ball 134b, and a spring 134c that pushes the ball 134b against the opening 133 of the main body 134a. The suction check valve 134 is closed, when a pressure inside the pump chamber 131 is a positive pressure, by blocking the opening 133 with the use of the urging force of the spring 134c, and is opened, when the pressure inside the pump chamber 131 is a negative pressure, by releasing the opening 133 with a contraction of the spring 134c. Meanwhile, the discharge check valve 136 also includes a cylindrical main body 136a served as a spring seat that receives the spring 128 and the spring 134c of the suction check valve 134 and having an opening 135 formed on a center thereof that communicates between the pump chamber 131 and the discharge port 132b, a ball 136b, and a spring 136c that pushes the ball 136b against the opening 135 of the main body 136a using the end plate 126 as a spring seat. The discharge check valve 136 is closed, when the pressure inside the pump chamber 131 is a negative pressure, by blocking the opening 135 with the use of the urging force of the spring 136c, and is opened, when the pressure inside the pump chamber 131 is a positive pressure, by releasing the opening 135 with a contraction of the spring 136c. Accordingly, when the power distribution to the coil 112 of the solenoid section 110 is turned off from on, the spool 124 is moved to the solenoid section 110 side by the urging force of the spring 136c and the spring 128 to set the pressure inside the pump chamber 131 to a negative pressure, so that the hydraulic oil can be sucked in the pump chamber 131 from the suction port 132a via the suction check valve 134. When the power distribution to the coil 112 of the solenoid section 110 is turned on from off, the spool 124 is moved to the end plate 126 side by the thrust from the solenoid section 110 to set the pressure inside the pump chamber 131 to a positive pressure, so that the sucked hydraulic oil can be discharged from the discharge port 132b via the discharge check valve 136.

Next, operations of the solenoid valve 100, namely, an operation when the solenoid valve serves as a linear solenoid and an operation when it serves as a solenoid pump, will be described. Firstly, the operation when the solenoid valve serves as the linear solenoid will be described. Now, a case where the power distribution to the coil 112 is turned off is considered. In this case, the spool 124 is moved to the solenoid section 110 side by the urging force of the springs 128, 134c, 136c, so that the input port 122a is blocked by the land 124b, and the output port 122b and the drain port 122c are in a communicated state via the communication portion 123a. Accordingly, the hydraulic pressure does not act on the clutch C1. When the power distribution to the coil 112 is turned on, the plunger 116 is attracted to the first core 114 by an attraction force in accordance with a magnitude of a current applied to the coil 112, and in accordance with this, the shaft 118 is pushed out and the spool 124 abutted against the tip of the shaft 118 is moved to the end plate 126 side. Accordingly, the input port 122a, the output port 122b, and the drain port 122c are in a mutually communicated state, resulting in that a part of the hydraulic oil input from the input port 122a is output to the output port 122b, and the remainder of the hydraulic oil is output to the drain port 122c. Further, the hydraulic oil is supplied to the feedback chamber through the feedback port 122d, and the feedback force in accordance with an output pressure of the output port 122b acts on the spool 124 in the direction of the solenoid section 110 side. Therefore, the spool 124 is stopped at a position at which the thrust (attraction force) of the plunger 116, the urging force of the spring 128, and the feedback force are balanced. At this time, as the current applied to the coil 112 becomes larger, namely, as the thrust of the plunger 116 becomes larger, the spool 124 moves further to the end plate 126 side, an open area of the input port 122a is made larger, and an open area of the drain port 122c is made smaller. When the maximum level of the power distribution is applied to the coil 112, the spool 124 is moved to a side closest to the end plate 126 within a movable range of the plunger 116, the input port 122a and the output port 122b are communicated by the communication portion 123a, and the drain port 122c is blocked by the land 124a so that the output port 122b and the drain port 122c are disconnected. Accordingly, the greatest hydraulic pressure acts on the clutch C1. As above, the solenoid valve 100 of the embodiment blocks the input port 122a, and communicates between the output port 122b and the drain port 122c in a state where the power distribution to the coil 112 is turned off, so that it can be understood that the solenoid valve 100 serves as a solenoid valve of normally-closed type.

Next, the operation when the solenoid valve 100 serves as the solenoid pump will be described. Now, a case where the power distribution to the coil 112 is turned off from on is considered. In this case, the spool 124 is moved to the solenoid section 110 side from the end plate 126 side, so that the pressure inside the pump chamber 131 becomes a negative pressure, resulting in that the suction check valve 134 is opened and the discharge check valve 136 is closed so that the hydraulic oil is sucked in the pump chamber 131 from the suction port 132a via the suction check valve 134. When the power distribution to the coil 112 is turned on from this state, the spool 124 is moved to the end plate 126 side from the solenoid section 110 side, so that the pressure inside the pump chamber 131 becomes a positive pressure, resulting in that the suction check valve 134 is closed and the discharge check valve 136 is opened so that the hydraulic oil sucked in the pump chamber 131 is discharged from the discharge port 132b via the discharge check valve 136. As above, by repeatedly turning on and off the power distribution to the coil 112 to apply a rectangular-wave current (hereinafter, this control is referred to as rectangular-wave current control), it is possible to make the solenoid valve 100 of the embodiment serve as the solenoid pump that pressure-feeds the hydraulic oil.

Figure 6:
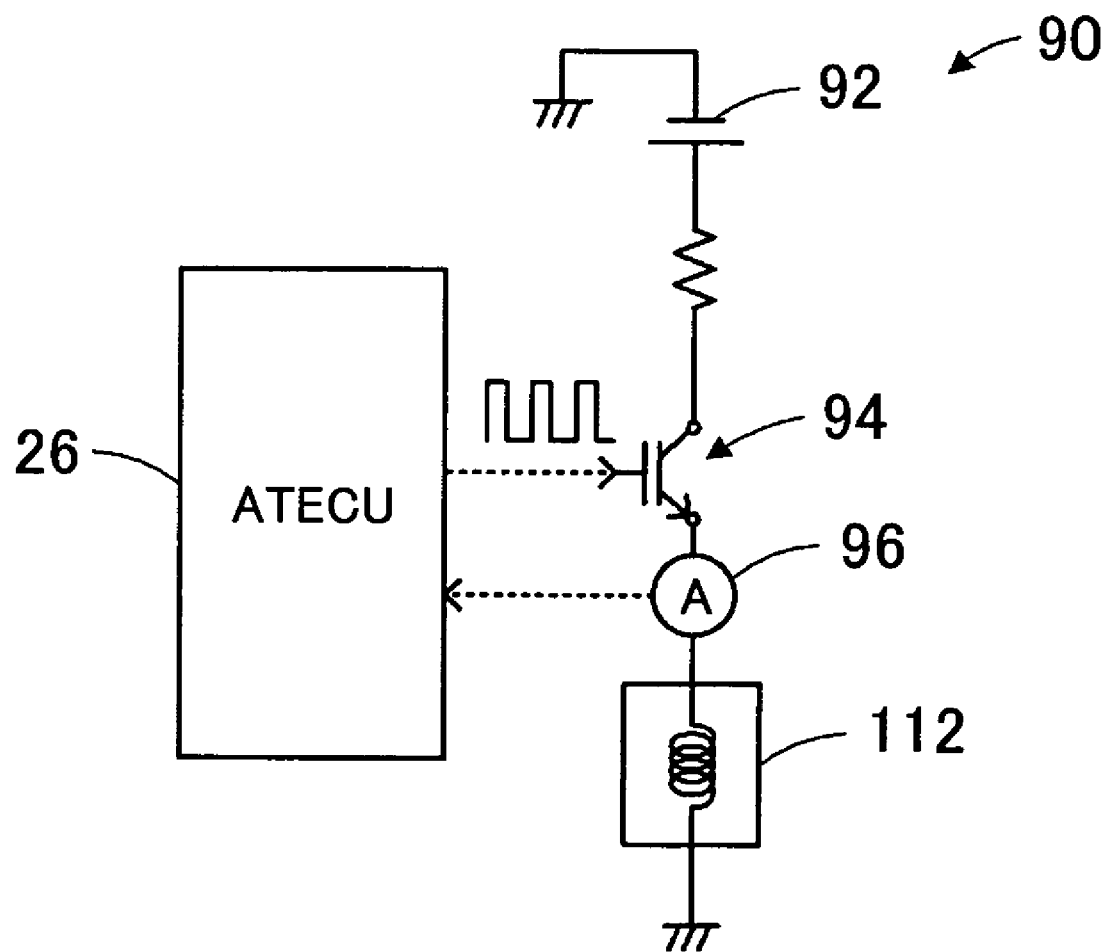
FIG. 6 is a structural diagram showing an outline of a structure of a drive circuit 90 of the solenoid valve 100.

The solenoid valve 100 is driven by a drive circuit 90 exemplified in FIG. 6. As illustrated, in the drive circuit 90, a direct current power supply 92 is connected to the coil 112 of the solenoid section 110 via a transistor 94 as a switching element, and a current flowing through the coil 112 can be adjusted by adjusting a ratio of ON-time of the transistor 94. Note that in the drive circuit 90, a current sensor 96 for detecting the current flowing through the coil 112 is provided. The above is the explanation made in detail on the solenoid valve 100.

The switching valve 50 is formed of a sleeve 52 in which various ports including a signal pressure input port 52a through which the line pressure PL is input as a signal pressure, an input port 52b connected to an oil passage 46 between the strainer 41a and the mechanical oil pump 42, an output port 52c from which the hydraulic oil input from the input port 52b is output, a drain port 52d, an input port 52e connected to the output port 122b of the pressure control valve section 120 of the solenoid valve 100, an input port 52f connected to the discharge port 132b of the pump section 130 of the solenoid valve 100, an output port 52g that selectively inputs a hydraulic pressure from these two input ports 52e, 52f, and outputs it to the clutch C1, an input port 52h connected to the drain port 132c of the pump section 130, and a drain port 52i from which the hydraulic oil input from the input port 52h is drained, a spool 54 that slides in the sleeve 52 in the axial direction, and a spring 56 that urges the spool 54 in the axial direction. In the switching valve 50, when the line pressure PL is input into the signal pressure input port 52a, the spool 54 overcomes the urging force of the spring 56 and is moved to a position shown by a right half region in the drawing, a communication between the input port 52b and the output port 52c is cut-off, the input port 52e and the output port 52g are communicated and the input port 52f is blocked, resulting in that the output port 122b of the pressure control valve section 120 and the oil passage 48 of the clutch C1 are communicated. When the line pressure PL is not input into the signal pressure input port 52a, the spool 54 is moved to a position shown by a left half region in the drawing because of the urging force of the spring 56, the input port 52b and the output port 52c are communicated to connect the suction port 132a of the pump section 130 to the oil passage 46 between the strainer 41a and the mechanical oil pump 42 via the switching valve 50, the input port 52e is blocked and the input port 52f and the output port 52g are communicated, resulting in that the discharge port 132b of the pump section 130 and the oil passage 48 of the clutch C1 are communicated. Note that it is designed such that when the line pressure PL is input into the signal pressure input port 52a, the input port 52b is blocked and the output port 52c and the drain port 52d are communicated so that the hydraulic oil is not supplied to the suction port 132a of the pump section 130, and the input port 52h and the drain port 52i are communicated so that the hydraulic oil is drained from the drain port 132c of the pump section 130.

Although not illustrated in detail, the ATECU 26 is formed as a microprocessor having a CPU as a central component, and includes, in addition to the CPU, a ROM that stores a processing program, a RAM that temporarily stores data, input/output ports, and communication ports. In the ATECU 26, an input shaft rotation number Nin from a rotation speed sensor 24 attached to the input shaft 36, an output shaft rotation number Nout from a rotation speed sensor attached to the output shaft 38, a current Ic from the current sensor 96 and the like are input via the input ports, and from the ATECU 26, a switching control signal to the switching element 94 of the drive circuit 90 of the solenoid valve 100, a switching control signal to a switching element of a not-shown drive circuit that drives various solenoids such as the linear solenoid 44 and the like are output via the output ports. The ATECU 26 communicates with the main ECU 60, and controls the automatic transmission 30 (hydraulic circuit 40) in accordance with the control signal from the main ECU 60, and outputs data regarding the state of the automatic transmission 30 to the main ECU 60 according to need.

Although not illustrated in detail, the main ECU 60 is formed as a microprocessor having a CPU as a central component, and includes, in addition to the CPU, a ROM that stores a processing program, a RAM that temporarily stores data, input/output ports, and communication ports. In the main ECU 60, an ignition signal from an ignition switch 70, a shift position SP from a shift position sensor 72 that detects an operating position of the shift lever 71, an accelerator opening degree Acc from an accelerator pedal position sensor 74 that detects a depressing amount of an accelerator pedal 73, a brake switch signal BSW from a brake switch 76 that detects a depressing amount of a brake pedal 75, a vehicle speed V from a vehicle speed sensor 78 and the like are input via the input ports. The main ECU 60 is connected to the engine ECU 18 and the ATECU 26 via the communication ports, and exchanges various controls signals and data with the engine ECU 18 and the ATECU 26.

The automobile 10 with such a structure automatically stops the engine 12 when it travels with the shift lever 71 in a "D (drive)" travelling position and all of previously set automatic stop conditions, which are, a value of the vehicle speed V is 0 (zero), the accelerator is off, the brake switch signal BSW is on, and the like, are satisfied. When the engine 12 is automatically stopped and previously set automatic start conditions such that the brake switch signal BSW is off are satisfied thereafter, the automatically stopped engine 12 is automatically started.

Figure 7:
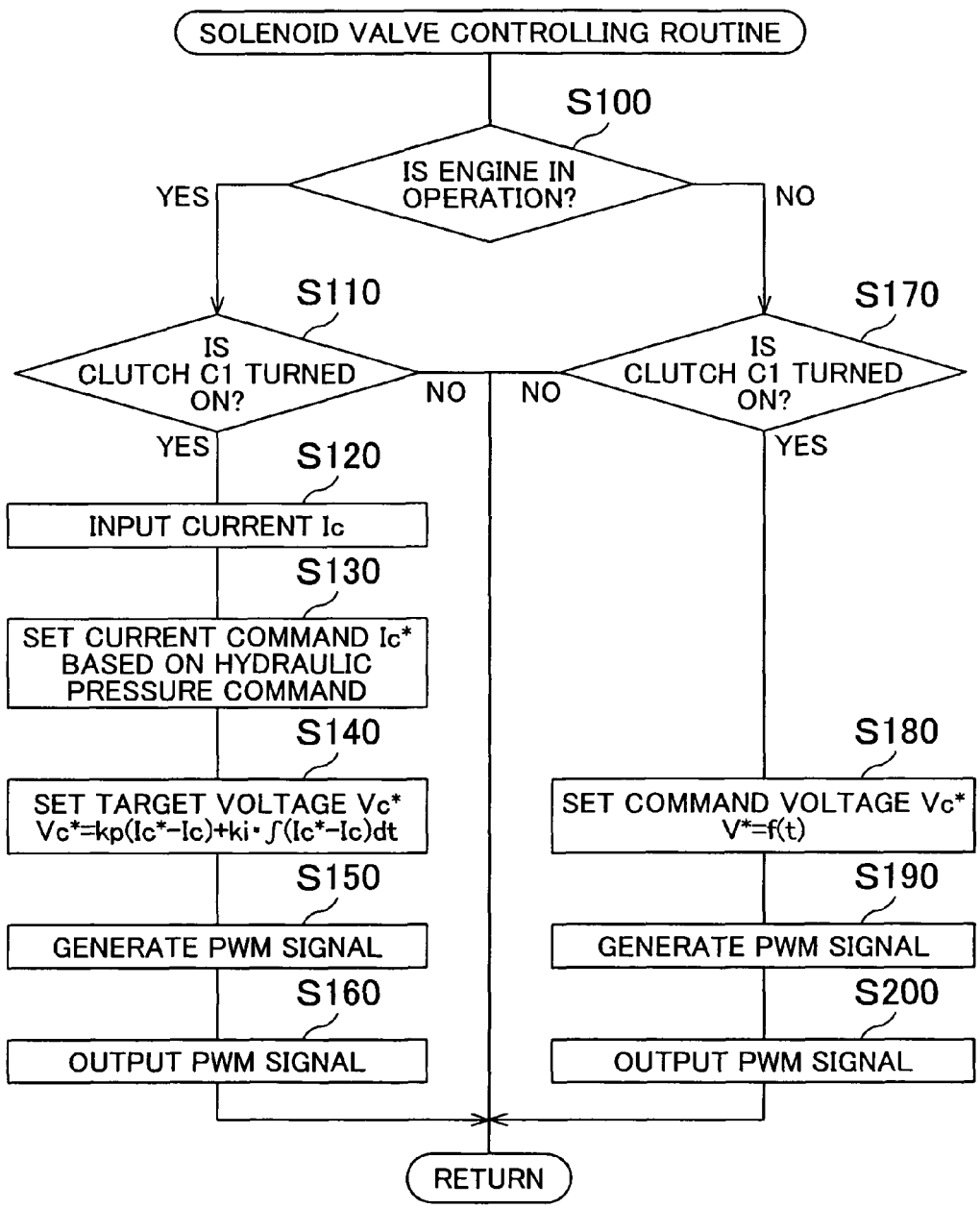
FIG. 7 is a flow chart showing an example of a solenoid valve controlling routine executed by an ATECU 26.

Next, an operation of the power transmission device 20 of the embodiment mounted on the automobile 10 structured as above, in particular, an operation of the solenoid valve device of the embodiment, will be described. FIG. 7 is a flow chart showing an example of a solenoid valve controlling routine executed by the ATECU 26. This routine is repeatedly executed at every predetermined period of time (at every several msec, for instance). Here, the solenoid valve 100 and the ATECU 26 correspond to the solenoid valve device of the embodiment.

Figure 8:
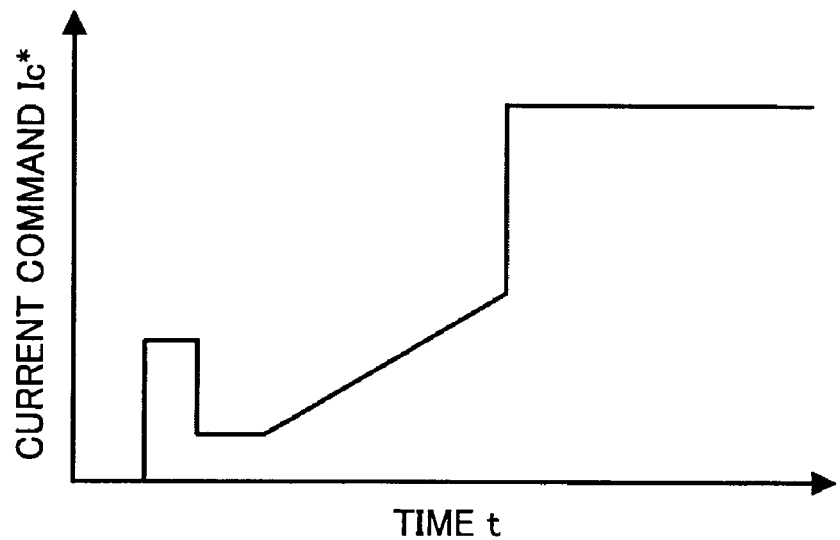
FIG. 8 is an explanatory diagram showing an example of a current command Ic*.

When the solenoid valve controlling routine is executed, the CPU of the ATECU 26 first determines whether or not the engine 12 is in operation (step S100), and determines, when the engine 12 is in operation, whether or not the turning-ON of the clutch C1 is requested (step S110). To a case in which the turning-ON of the clutch C1 is requested during the operation of the engine, the one in which the shift lever 71 is in the D position and the automatic start conditions of the engine 12 are satisfied to automatically start the engine 12, or the like corresponds. When the turning-ON of the clutch C1 is not requested, the present processing is directly terminated. Meanwhile, when the turning-ON of the clutch C1 is requested, it is determined that the solenoid valve 100 is served as the pressure control valve, the current Ic from the current sensor 96 is input (step S120), and a current command Ic* is set based on a hydraulic pressure command (step S130). Here, in the embodiment, it is designed such that the setting of the current command Ic* is conducted by previously obtaining a relationship between the hydraulic pressure command and the current command Ic* to store it as a map in the ROM of the ATECU 26, and retrieving, when the hydraulic pressure command is given, the corresponding current command Ic* from the map. FIG. 8 shows an example of the current command Ic*. When the current Ic is input and the current command Ic* is set, a target voltage Vc* is set by the following expression (1) based on the input current Ic and the set current command Ic* (step S140), a PWM signal is generated based on the set target voltage Vc* (step S150), the generated PWM signal is output to the transistor 94 of the drive circuit 90 (step S160), and the present routine is terminated. The expression (1) is a relational expression in the feedback control for matching the current Ic from the current sensor 96 with the current command Ic*, and "kp" and "ki" in the expression (1) respectively indicate a gain in a proportional term and a gain in an integral term. With the use of such a feedback control, it is possible to engage the clutch C1 with a relatively high pressure control accuracy.

$$Vc^* = kp(Ic^* - Ic) + ki\int(Ic^* - Ic)dt \quad (1)$$

Figure 9:
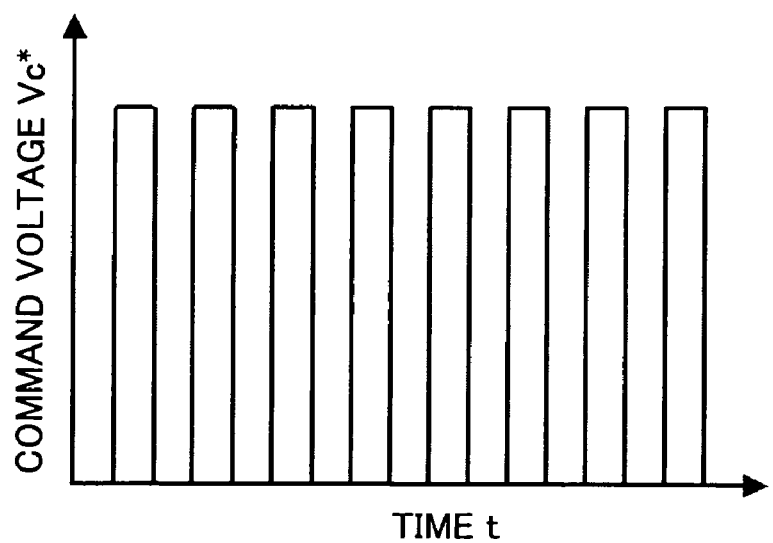
FIG. 9 is an explanatory diagram showing an example of a command voltage setting map.

When it is determined in step S100 that the engine 12 is not in operation, namely, it is being stopped, the CPU determines whether or not the turning-ON of the clutch C1 is requested (step S170). To a case in which the turning-ON of the clutch C1 is requested when the engine is being stopped, the one in which the shift lever 71 is in the D position and the automatic stop conditions of the engine 12 are satisfied to automatically stop the engine 12 corresponds. When the turning-ON of the clutch C1 is not requested, the present processing is directly terminated. Meanwhile, when the turning-ON of the clutch C1 is requested, it is determined that the solenoid valve 100 is served as the solenoid pump, a rectangular-wave command voltage Vc* is set (step S180), a PWM signal is generated based on the set command voltage Vc* (step S190), the generated PWM signal is output to the transistor 94 of the drive circuit 90 (step S200), and the present routine is terminated. In the embodiment, the setting of the command voltage Vc* is designed to be conducted based on an elapsed time from when the turning-ON of the clutch C1 is requested and a map exemplified in FIG. 9. Note that the reason why the solenoid valve 100 is served as the solenoid pump to pressure-feed the hydraulic oil to the clutch C1 when the shift lever 71 is in the D position and the engine 12 is being stopped is to smoothly carry out the starting of the vehicle by promptly engaging the clutch C1 when the automatic start conditions of the engine 12 are satisfied thereafter. In the embodiment, the solenoid valve 100 is designed to have a pumping performance as the solenoid pump which is set to such a level that the hydraulic oil can be supplemented from the pump section 130 by the amount of the leakage from a seal ring and the like provided between a clutch piston and a drum.

When the solenoid valve 100 in which the pressure control valve section 120 and the pump section 130 are integrally provided is served as the solenoid pump, it is generally preferable to magnify a change in a duty ratio and to make a period of the change as short as possible in order to make the solenoid valve fully exhibit the pumping performance as the solenoid pump. However, when the rectangular-wave current is tried to be applied to the solenoid section 110 (coil 112) by conducting the feedback control to match the current Ic from the current sensor 96 with the current command Ic*, a current response is deteriorated, which results in limiting the duty ratio and the period. As described above, a high pressure control accuracy is required when the solenoid valve 100 is served as the pressure control valve, so that it is preferable to conduct the aforementioned feedback control for making the solenoid valve fully exhibit a pressure control performance. However, when the solenoid valve 100 is served as the solenoid pump, the high pressure control accuracy is not required, so that by directly setting the rectangular-wave command voltage Vc* without conducting the feedback control, it is possible to set the duty ratio and the period for making the solenoid valve fully exhibit the pumping performance as the solenoid pump. Based on such a reason, the drive circuit 90 is controlled by conducting the feedback control when the solenoid valve 100 is served as the pressure control valve, and is controlled without conducting the feedback control when the solenoid valve 100 is served as the solenoid pump.

According to the solenoid valve device of the embodiment described above, the pressure control valve section 120 served as the pressure control valve and the pump section 130 served as the solenoid pump are integrally formed by sharing the solenoid section 110 to structure the solenoid valve 100, in which when the solenoid valve 100 is served as the pressure control valve, the drive circuit 90 is controlled by setting the command voltage Vc* through the feedback control to match the current Ic from the current sensor 96 with the current command Ic*, and when the solenoid valve 100 is served as the solenoid pump, the drive circuit 90 is controlled by setting the rectangular-wave command voltage Vc* without conducting the feedback control. Accordingly, it is possible to realize the downsizing of the solenoid valve 100 by integrally forming the pressure control valve and the solenoid pump, while making the solenoid valve fully exhibit the performance as the pressure control valve and the performance as the solenoid pump. As a result of this, by incorporating the solenoid valve device in the power transmission device, it is possible to downsize the power transmission device.

The solenoid valve device of the embodiment is designed such that when the solenoid valve 100 is served as the solenoid pump, the rectangular-wave command voltage Vc* is directly set, but, it is also possible to design such that the rectangular-wave current command Ic* is set, and the target voltage Vc* is calculated based on the current command Ic* and a resistance value of the coil 112.

The solenoid valve device of the embodiment is designed such that when the solenoid valve 100 is served as the pressure control valve, the solenoid section 110 is driven through the feedback control using the proportional term and the integral term, but, it is also possible to design such that the solenoid section 110 is driven through the feedback control using only the proportional term or through the feedback control using the proportional term, the integral term, and a differential term. Further, there is no problem to design such that the solenoid section 110 is driven through not only the feedback control using such feedback terms but also the feedback control using the feedback term and a feed forward term.

The solenoid valve device of the embodiment is designed such that the pressure control valve section 120 of the solenoid valve 100 is structured as the one of normally-closed type, but, may be structured as the one of normally-open type.

Although the solenoid valve device of the embodiment is explained that is applied to the one in which the solenoid valve 100 in which the pressure control valve for controlling the pressure of the hydraulic oil pressure-fed from the mechanical oil pump 42 and supplying the oil to the clutch C1 and the solenoid pump for pressure-feeding the hydraulic oil to the clutch C1 when the engine 12 is being stopped are integrally formed is incorporated in the power transmission device, it is not limited to this, and as long as the solenoid valve has the pressure control valve and the solenoid pump formed in an integral manner by using the common solenoid section, there is no problem if the solenoid valve is applied to any apparatus.

In the embodiment, the five-speed automatic transmission 30 with first to fifth forward speeds is designed to be incorporated, but, an automatic transmission of any number of speeds such as four-speed, six-speed, or eight-speed may be incorporated, and the automatic transmission may also be connected to the crankshaft 14 of the engine 12 via the clutch, or directly connected to the wheels 86a, 86b via the differential gear 84.

Here, a correspondence between the main components of the embodiment and the main components of the invention described in the description of the disclosure of the invention will be explained. In the embodiment, the solenoid valve 100 corresponds to "solenoid valve", the drive circuit 90 corresponds to "drive circuit", the current sensor 96 corresponds to "current sensor", and the ATECU 26 corresponds to "control unit". Further, the engine 12 corresponds to "motor", and the hydraulic circuit 40 corresponds to "fluid pressure circuit". Further, the mechanical oil pump 42 corresponds to "mechanical pump". Here, the "motor" is not limited to the internal combustion engine that outputs power using a hydrocarbon-based fuel such as gasoline and light oil, and it may be any type of internal combustion engine such as a hydrogen engine, or any type of motor as long as it can output power, such as an electric motor other than the internal combustion engine. Note that the correspondence between the main components of the embodiment and the main components of the invention described in the description of the disclosure of the invention is an example for concretely explaining the best modes for carrying out the invention described in the description of the disclosure of the invention conducted by the embodiment, so that it does not limit the components of the invention described in the description of the disclosure of the invention. Specifically, the invention described in the description of the disclosure of the invention should be interpreted based on the description of the disclosure of the invention, and the embodiment is only a concrete example of the invention described in the description of the disclosure of the invention.

The explanation regarding the best modes for carrying out the present invention has been made above using the embodiment, and it is needless to say that the present invention is not limited in any way to such an embodiment and it can be carried out in various modes without departing from the scope of the present invention.

The present invention can be utilized in a manufacturing industry of solenoid valves and the like.

What is claimed is:

1. A solenoid valve device, comprising:
    a solenoid valve having a hollow sleeve in which a first port group including an input port, an output port, and a drain port, and a second port group including a suction port and a discharge port are formed, a spool which is a shaft member to be inserted into the sleeve and capable of opening/closing the respective ports by sliding in an axial direction, a spring that urges the spool in the axial direction, and a solenoid section that generates a thrust with respect to the spool in a direction opposite to the spring, the solenoid valve being formed with a pressure control chamber formed between the sleeve and the spool to serve as a pressure control valve that adjusts the thrust generated in the solenoid section to control a pressure of a hydraulic fluid input into the input port through a discharge of the fluid from the drain port and outputs the fluid from the output port, and a pump chamber formed by being divided as a space isolated from the pressure control chamber between the sleeve and the spool to serve as a solenoid pump that sucks the hydraulic fluid via the suction port and discharges the fluid from the discharge port by repeatedly making the solenoid section generate the thrust and stop the generation thereof;
    a drive circuit that drives the solenoid section;
    a current sensor that detects a current applied to the solenoid section; and
    a control unit that controls, when the solenoid valve is served as the pressure control valve, the drive circuit by performing a feedback control based on the current detected by the current sensor so that a current in accordance with an output pressure command is applied to the solenoid section, and controls, when the solenoid valve is served as the solenoid pump, the drive circuit without performing the feedback control so that a pump current is applied to the solenoid section.

2. The solenoid valve device according to claim 1, wherein:
    the drive circuit is a circuit that adjusts a power supply voltage and applies the voltage to a coil of the solenoid section by performing a switching of a switching element; and
    the control unit is a unit of controlling, when the solenoid valve is served as the pressure control valve, the drive circuit by setting a target voltage based on a deviation between a current command in accordance with the output pressure command and the current detected by the current sensor, and controlling, when the solenoid valve is served as the solenoid pump, the drive circuit by directly setting a rectangular-wave command voltage.

3. A power transmission device in which an input shaft and an output shaft are connected to an output shaft of a motor and an axle side of a vehicle, respectively, and which transmits a power input into the input shaft to the output shaft by switching an engagement state of a clutch, the power transmission device, comprising
    the solenoid valve device according to claim 1 incorporated in a fluid pressure circuit that operates the clutch with a fluid pressure.

4. The power transmission device according to claim 3, further comprising:
    an automatic transmission capable of transmitting a power from the motor to the axle side by switching an engagement state of a plurality of clutches to change a transmission ratio; and
    a mechanical pump that is driven by the power from the motor to generate the fluid pressure, wherein
    the solenoid valve device inputs the fluid pressure from the mechanical pump side via the input port and supplies the fluid pressure to the clutch side via the output port while controlling the pressure when the solenoid valve is served as the pressure control valve, and sucks the hydraulic fluid via the suction port as well as generates the fluid pressure and supplies the fluid pressure to the clutch via the discharge port when the solenoid valve is served as the solenoid pump.

5. The power transmission device according to claim 4, further comprising
    a control unit that controls the solenoid section to make the fluid pressure act on a clutch that forms a transmission ratio for starting among the plurality of clutches by making the solenoid valve serve as the solenoid pump when the motor is stopped in accordance with the stop of the vehicle.

6. The power transmission device according to claim 3, wherein
    the motor is an internal combustion engine capable of executing automatic stop and automatic start.

* * * * *